United States Patent [19]
Widmayer

[11] Patent Number: 5,519,311
[45] Date of Patent: May 21, 1996

[54] CONTROL OF AC POWER TO INDUCTIVE LOADS

[75] Inventor: Don F. Widmayer, Bethesda, Md.

[73] Assignee: Don Widmayer & Associates, Inc., Bethesda, Md.

[21] Appl. No.: 571,830

[22] Filed: Jan. 19, 1984

[51] Int. Cl.$^6$ .................................................. G05F 1/445
[52] U.S. Cl. .................. 323/319; 323/236; 323/239; 323/245; 323/324; 315/194
[58] Field of Search ....................... 323/236, 239, 323/245, 319, 324, 237, 320, 351; 315/194, 151, 156, 240, 209 R

[56] References Cited

U.S. PATENT DOCUMENTS

| | | | |
|---|---|---|---|
| 3,201,597 | 8/1965 | Balan | 323/324 |
| 3,679,932 | 7/1972 | Murphy | 315/240 |
| 4,302,717 | 11/1981 | Olla | 323/324 |
| 4,447,765 | 5/1984 | Cote | 315/240 |
| 4,507,569 | 3/1985 | Hess | 307/130 |

FOREIGN PATENT DOCUMENTS 1460006  12/1976  United Kingdom ................. 315/194

Primary Examiner—Peter S. Wong
Assistant Examiner—A. Berhane
Attorney, Agent, or Firm—Larson and Taylor

[57] ABSTRACT

A control system is provided for controlling the average power from an alternating voltage source (AC) to a load having inductive properties. The system uses a synchronous switch shunted by a capacitor connected between the source (generator) and sink (load) to pulse duration modulate the AC voltage carrier wave. A control signal generator circuit drives the synchronous switch such that the switch is closed at a variable time early in each half-wave of the AC voltage source carrier wave and such that the switch is opened at a subsequent later, variable time during that half-wave. This is accomplished by sensing the voltage across the synchronous switch in order to inhibit closing of the switch early in the half-wave until the synchronous switch voltage (and thus the voltage on the capacitor) is substantially zero and then opening the synchronous switch at a point in time to give the desired volt-second area between closure and opening within each half-wave.

15 Claims, 2 Drawing Sheets

CONTROL OF AC POWER TO INDUCTIVE LOADS

FIELD OF THE INVENTION

This invention relates to the control of electrical power from a source characterized by a single frequency carrier wave of an alternating voltage amplitude to be delivered to load devices with inductive properties.

BACKGROUND OF THE INVENTION

As is discussed in more detail below, a number of different techniques have been developed for controllng the amount of power supplied to an inductive load from AC sources. Three prior techniques, which involve synchronous operation of suitable electronic device switches such as a thyristors or transistors, have been termed AC phase control, "inverse" AC phase control and "symmetrical" AC phase control. The term "phase control" embraces the notion of synchronous switching. All of these methods are varients of the basic technique of Pulse Duration Modulation (PDM) or Pulse Width Modulation, normally associated with pulse carrier systems, but in the context of the control power of AC power, usually denoted as "phase control". These techniques are discussed in more detail below together with the shortcomings thereof insofar as the requirements of the loads of the type with which the invention is concerned, i.e., loads having inductive properties.

As will appear, the present invention is applicable to, but in no way limited to, lighting control systems. Patents of interest in the field include some of my earlier patents, e.g., U.S. Pat. Nos. 4,394,603 (issued on Jul. 19, 1983) and 4,352,045 (issued on Sep. 28, 1982) and the references cited therein as well as U.S. Pat. No. 4,350,935 (Spira et al) and the references referred to in the introductory portions thereof and cited therein. More generally, as noted above, the basic prior art AC power control techniques are also discussed below.

SUMMARY OF THE INVENTION

The control system of the invention provides pulse duration modulation (PDM) of a power source voltage carrier wave (AC) which is implemented through the provision of a switching device or devices driven synchronously with respect to the carrier wave. The range of devices used in implementing the synchronous switch can be electronic in nature such as transistors of bipolar, unipolar or hybrid construction (e.g., an insulated gate transistor) as well as PNPN junction devices, such as thyristors (SCRs, TRIACS and the like) in suitable circuit configurations and other suitable electronic switching devices. Further, even non-electronic switching devices can be employed so long as these devices possess the necessary dynamic capabilities along with suitable impedance properties characterizing the required two state (i.e., "on" and "off") operation, as well as rating capabilities consistent with maximum values of the alternating amplitudes (voltage and/or current) in terms of adequate circuit performance and device life.

The invention is particularly concerned with the control of power supplied from an AC source to an inductive load wherein a switch, connected between the AC source and the inductive load, is synchronously operated from a control means for driving the switch in timed (e.g., synchronous) relation to the AC source carrier wave so as to control the average active power supplied to the inductive load. To counter the evident effect of opening the circuit containing the inductive load (and hence interrupting the current), a capacitor is connected in shunt across the switch, and the control means is operated in such a manner that the switch is closed only when the voltage thereacross is substantially zero (and thus zero energy is stored in the shunt capacitor) with the subsequent or later opening of the switch adjusted to accommodate this operation. Generally speaking, in its broader aspects, the invention involves the provision of a sensing means for sensing the voltage across the switch during each half wave and for inhibiting closing of the switch by the control means during the half wave until the voltage on the switch (and thus on the capacitor) is substantially zero. As explained below, by controlling the time at which the switch closes in this manner, the present invention overcomes problems associated with the use of conventional prior art "AC phase control" techniques in systems of the type under discussion.

In a preferred embodiment, the synchronous switch comprises a transistor, the collector-emitter circuit of which is connected between a first pair of terminals of a full wave rectifier bridge circuit and the base circuit of which is connected to the control means, with the shunt capacitor being connected across the second pair of terminals of the rectifier bridge (constituting the terminals of the synchronous switch). The sensing means preferably senses the voltage across the first pair of terminals of the rectifier bridge circuit, i.e., on the DC side. In an advantageous embodiment, the sensing means comprises a further transistor the base circuit of which is connected to the first set of bridge terminals and the collector-emitter circuit of which is connected in the base circuit of the first-mentioned transistor in shunt with the connection between the base circuit of the first-mentioned transistor and the control means, so that switching of the "further" or second transistor controls transmission of the output signal from the control means to the base circuit of the first-mentioned transistor. Preferably, the further transistor is connected to a positive terminal of the bridge circuit through a first resistor and a further resistor is connected between the base circuit of the further transistor and a common supply line to which the emitter electrodes of the two transistors are connected.

Other features and advantages of the present invention will be set forth in, or apparent from, the detailed description of the preferred embodiments of the invention found hereinbelow.

DESCRIPTION OF THE PREFERRED EMBODIMENTS

Figure 1:
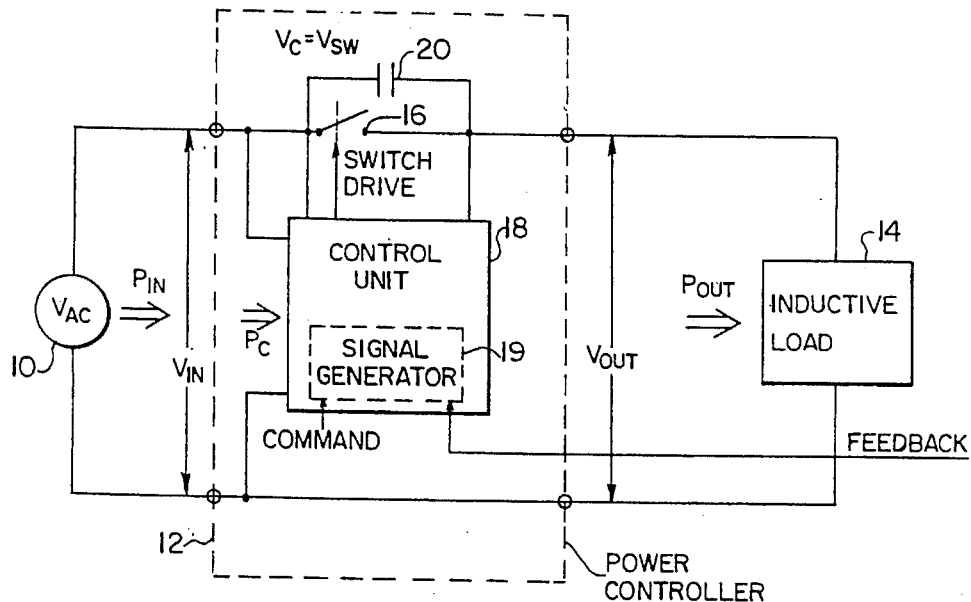
FIG. 1 is a block diagram of a system in which the present invention is incorporated.

Referring to FIG. 1, a block diagram is provided of the basic units or components of a system incorporating the invention. A constant power source 10 is connected through a power controller 12, indicated in dashed lines, to an inductive load 14 representing a real power load having parasitic or desired magnetic energy storage effects. The power supplied to the load 14 is controlled by a series-disposed, synchronous switching device 16 of a control unit 18 operated in a suitable variation of a PDM mode under the control of a signal generator 19. As a consequence of the effects of the magnetic energy storage of the inductive load 14, when the switch 16 is driven open with a circuit current magnitude other than zero, current will flow through a capacitor 20 connected in shunt relationship with the synchronously driven switch 16.

The present invention is particularly concerned with the drive provided for switch 16 in relation to shunt capacitor 20. Functionally, the capacitor 20 of FIG. 1 may be considered to act as a current-time integrator for circuit current flowing at the time the synchronous switch 16 is opened due to the energy storage of inductive load 14. In accordance with the present invention, if the voltage on capacitor 20 (which is the voltage across the open synchronous switch 16) is non-zero, the signal generator 19 of the control unit 18 inhibits the reclosing of the synchronous switch 16 until the voltage thereacross, and thus on capacitor 20, reaches the natural zero of the transient response state of the circuit, i.e., when $V_C=0$. Only when the condition $V_C=0$ is reached, is switch 16 allowed to close.

Before considering the invention in further detail, a brief review will be provided of certain fundamentals of inductive energy storage effects and of concepts relating to pulse duration modulation as applied to control of power from AC sources. Furthermore, some consideration of power factor in AC electrical power systems is also thought to be useful in providing a fuller understanding of the invention and the prior art.

As is well known, an inductor is a device that has the property of storing energy in a magnetic field associated with the flow of current through the electric terminals of the devices, (i.e., the inductance parameter), as opposed to other storage and/or dissipation properties. Because of the energy storage property of an inductor (represented by its inductance), when the inductor current is interrupted, the inductor will act as a voltage source. In some circumstances, the voltage produced could increase until an insulation breakdown occurs. Because of such deleterious effects, inductive circuits should not be opened ("turned off") while there is current flow, i.e., while $i \neq 0$. The magnitude of the energy ($W_m$) stored in an inductor depends on the inductance (L) thereof and the inductor current i.e., $W_m = \frac{1}{2} Li^2$.

As is also well known, a capacitor is a device that stores energy in the form of an electric field associated with a voltage across the capacitor terminals. The magnitude ($W_E$) of the energy stored in a capacitor depends upon the capacitance (C) of the capacitor and the voltage (v) thereon, i.e., $W_E = \frac{1}{2} Cv^2$. The rapid discharge of a charged capacitor results in a high current transient. Because of the deleterious effects such a transient can produce, precautions are taken in protecting the devices involved from the rapid discharge of a capacitor. For this reason, when a capacitor is connected in shunt with a switch, the switch should not be closed (turned "on") unless the charge (i.e., the voltage) on the capacitor is at or near zero.

Pulse duration modulation techniques used in pulse carrier systems adapted for AC power control use are generally based on varying the duration of the "on" portion of the duty cycle (the period of the carrier during which the synchronous control switch is closed) so as to vary the average power delivered to the load. Such PDM techniques are widely adapted to AC power control and PDM is commonly termed "AC phase control" in such a context. Different methods of carrying out the duty cycle variation will be described.

Figure 2:
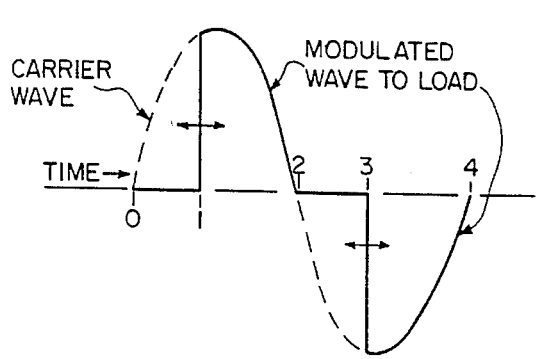
FIG. 2 is a waveform diagram illustrating a typical pulse duration modulated waveform delivered to a load in accordance with "normal" AC phase control techniques.

In "normal" AC phase control, illustrated in FIG. 2, the synchronous switch is closed at some phase angle following the zero crossover of the alternating carrier wave as indicated by the time periods 1–2 and 3–4 in FIG. 2. Subsequently, the switch is usually opened at the nominal zero crossover of the carrier source as is also illustrated in FIG. 2 (periods 0–1 and 2–3). Thus, within the time period of a half-wave, the "switch closed" time period follows the "switch opened" time period with the open-to-close transition being the leading edge of the pulse duration modulated wave which is adjustable in a controlled manner to vary the off-time/on-time ratio as indicated by the double headed arrow. This type of AC phase control generally uses a thyristor to implement the synchronous switch but a transistor can be used as well.

Figure 3:
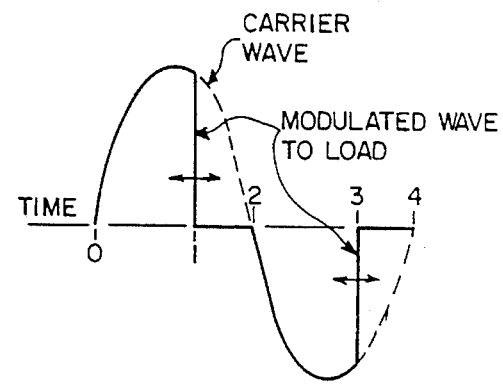
FIG. 3 is a waveform diagram illustrating a typical pulse duration modulated wave delivered to a load in accordance with "inverse" AC phase control techniques.

A second type of PDM timing control has been termed "inverse" AC phase control because the sequence of the switching states is the inverse of that used for "normal" AC phase control. With "inverse" AC phase control, the "switch closed" time period begins at the zero crossing of the carrier wave and the switch is turned off (opened) at some controlled phase angle after the zero crossover, as illustrated in FIG. 3. Obviously, this opening action occurs when load current is flowing. Thus, within the period of a carrier half-wave, the "switch closed" time period precedes, rather than follows, the "switch opened" period. This is shown in FIG. 3 wherein the switch is closed during the periods 0–1 and 2–3 and open during the periods 1–2 and 3–4.

Figure 4A:
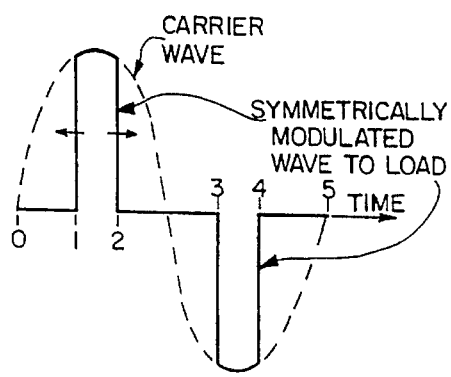
FIGS. 4(a) and 4(b) are waveforms similar to those of FIGS. 2 and 3, in accordance with "symmetrical" AC phase control techniques.
Figure 4B:
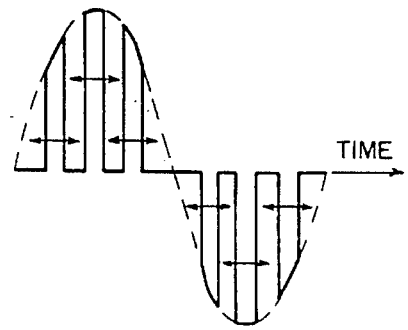

A third type of AC phase control can be described as symmetrical AC phase control because the turn-on (closed) and turn-off (opened) time periods of the synchronous switch, and therefore, the output waves produced, vary symmetrically with respect to the midpoint (90°) of the carrier wave, as illustrated in FIGS. 4(a) and 4(b).

A further familiar electrical quantity used in connection with AC power systems is power factor. Power factor in AC electrical power systems is defined at the source/sink interface to a load as the ratio of the total average active power to the average apparent power, i.e., the product of the root mean square (RMS) voltage and the RMS current. Thus, power factor (Fp)=active power/apparent power. If the current has the same waveform as the voltage, and if the current is in phase with the voltage, then the average active power will equal the average apparent power at the interface. In such an instance, Fp would be unity.

Many loads (or load source/sink interfaces) have power factors of less than unity. There are two basic causes for this. The first involves "displacement power factor" ($F_{DP}$) which is the cosine of the phase angle (cos Θ) between the fundamental component of the current and the voltage, assuming that both waveforms are sinusoidal. The second relates to distortion, which is characterized by the flow of harmonic currents other than the fundamental current, i.e., the first harmonic, due to non-linearities of synchronous switching in time. Such distortion is quantified as a "distortion factor" when the voltage is sinusoidal and is represented by the equation $(F_D={}^fI_{RMS}/{}^tT_{RMS}$ where ${}^fI_{RMS}$ is the fundamental RMS current component and ${}^tT_{RMS}$ is the total RMS current.

Accordingly, the displacement power factor (cos Θ) of a branch circuit is unity if there is zero phase displacement between the fundamental current and voltage waveforms and the circuit distortion factor ($F_D$) is unity, so long as the voltage and current are only the fundamental. It should be noted that when cos Θ ($F_{DP}$) and $F_D$ are known, the branch circuit (i.e., load) power factor can be calculated as the product of the two individual factors, i.e., $F_p=F_{DP} \times F_D$.

A substantial lowering of power factor usually occurs in AC phase control systems with a concomitant increase in current amplitude for a given level of active power. Both normal and inverse AC phase control lower both the displacement power factor as well as the distortion factor whereas symmetrical AC phase control maintains displacement power factor at unity, but lowers the distortion power factor. In normal AC phase control the fundamental current wave will always lag the voltage wave and therefore is characterized as having a lagging displacement power factor. In inverse AC phase control, the fundamental current wave leads the voltage carrier in time and thereby is characterized as having a leading power factor which, as will be explained, is germane to the present invention. In symmetrical AC phase control, the displacement factor remains at unity due to the symmetry of the current waveform(s) relative to the voltage. Nevertheless, significant distortion is present in symmetrical AC phase control circuits, and hence a corresponding decrease in the power factor from unity still occurs.

None of the conventional techniques described above, i.e., normal, inverse and symmetrical phase control methods, can be successfully employed with an inductive load employing a control switch and a shunt capacitor arrangement as generally depicted in FIG. 1.

Considering each technique individually, in the case of direct AC phase control (illustrated in FIG. 2) a capacitor shunting the synchronous switch such as discussed above in connection with FIG. 1 would serve no useful purpose. The load current in normal AC phase control is zero when the switch is opened. A shunt capacitor (corresponding to capacitor 20 of FIG. 1) would, without benefit, change to the instantaneous level of the source voltage at the time that the switch (corresponding to switch 16 of FIG. 1) is closed and the modulated wave begins. At that point the energy stored in the capacitor 20 would be rapidly discharged as a large current transient which would be dissipated as heat in the switch 16. Thus heat would be generated and circuit efficiency would be lowered. The discharge would cause a repetitive current transient in each half wave which could have destructive effects on the synchronous switch 16.

In the case of symmetrical AC phase control, illustrated in FIGS. 4 (a) and 4 (b), the use of a shunt capacitor 20 to suppress transient voltages on the synchronous switch device will again result in the discharge transient problems at the time of switch closure. The energy stored by the capacitor 20 would then be rapidly discharged as a large current transient in the switch 16. This transient would be dissipated as heat in the switch 16 and have other deleterious effects including forward second breakdown when transistors are used to implement the synchronous switch 16. In the case where the synchronous switch 16 is turned on and off more than once during a single half-wave of the source carrier, as shown in FIG. 4(b), the problems simply become more severe.

In the case of inverse AC phase control, when the synchronous switch 16 is opened an inductive transient will occur because the action of switch 16, in reducing the current, causes an induced voltage in accord with Faraday's Law. The use of capacitor 20 will "clamp" the inductive discharge voltage by storing the energy. The induced voltage combines with the AC source voltage to charge the capacitor 20 to a voltage level in excess of that of the AC voltage source 10. When the voltage on capacitor 20 exceeds the instantaneous voltage from the AC source 10 the load current reverses and the capacitor stored energy is then delivered back to the two "charging" sources as leading volt-amperes reactive (VAR). The rate that the leading VAR is returned is related to the resistance and inductance of the load 14, the voltage charge on the capacitor 20 and other circuit variables. Because of these variables, the voltage across capacitor 20 at the time of zero crossover of the AC carrier wave can be several hundred volts. If the switch 16 were to be closed under such a circumstance, the stored energy of capacitor 20 ($W_E=\frac{1}{2} Cv^2$) would be dissipated as a current transient which would be harmful to the switch 16 and most certainly reduce circuit efficiency. The actual circuit mechanics are quite complex in that the duration of the on-period of the modulated wave ($V_{out}$) along with other load and circuit factors determine the level of current flow. Therefore, the amount of stored reactive energy ($W_m=\frac{1}{2} Li^2$) in the inductive load 14 is converted into a voltage on capacitor 20, and this voltage, together with the AC carrier voltage existing at the time the capacitor 20 is charging, determines the energy stored by the capacitor 20 ($W_E=\frac{1}{2} Cv^2$). Further, since the duration of the on-period of the modulated wave varies as a function of the desired control action, the capacitor-stored energy, and the rate that this energy is delivered back to the charging source, continuously changes with the control action being effected. Because of these and other factors, the occurrence of the natural zero of the transient response of the circuit, i.e., the condition in which the voltage ($V_{sw}$) across the switch, and thus the capacitor, is zero, varies during a half cycle. Accordingly, while the natural zero ($V_{SW}=0$) is indirectly dependent on the zero crossover of the alternating voltage carrier wave, it is important to note that they are normally not congruent in time. The exception to this lack of congruence is the rare occasion when the circuit balance is such that $V_{SW}=0$ at the time of the voltage crossover of the carrier wave.

For the reasons discussed above, the arrangement of the type shown in FIG. 1, wherein a synchronous switch 16 is employed along with a "clamping" capacitor 20, cannot use the inverse or symmetrical AC phase control techniques described above.

As discussed above, the present invention involves the use of a generalized PDM approach wherein the voltage on the synchronous switch 16 is sensed and the drive for the synchronous switch from the control unit 18 is adjusted accordingly during each half cycle of the voltage carrier wave. In particular, the synchronous switch is turned on in timed coincidence with the occurence of the time varying natural circuit zero, i.e., when $V_{SW}=0$. One embodiment of the invention which provides for such operation is that depicted in FIG. 5.

Figure 5:
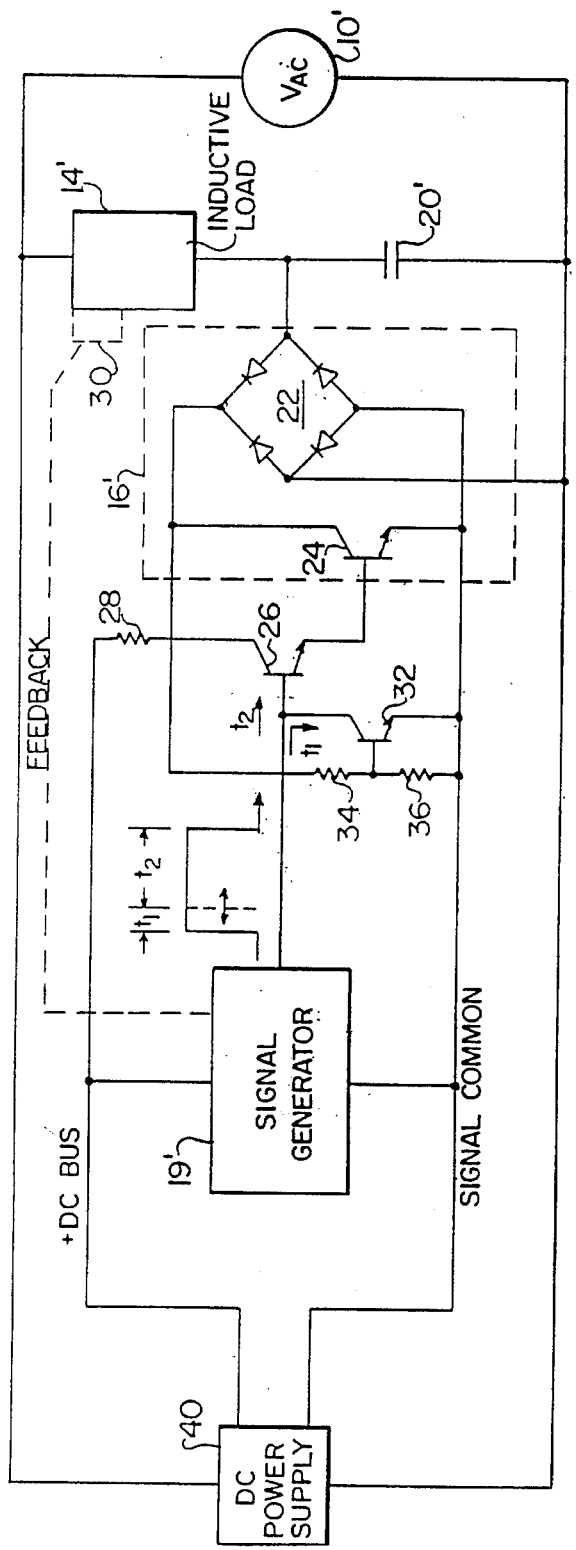
FIG. 5 is a circuit schematic diagram of an AC power control circuit in accordance with one preferred embodiment of the invention.

Referring to FIG. 5, there is illustrated the control logic and synchronous switching circuitry employed in accordance with one preferred embodiment of the control system of the invention. In the embodiment of FIG. 5, the synchronous switch 16' (corresponding to synchronous switch 16 in FIG. 1) is implemented by a full wave rectifying diode bridge 22 and an NPN bipolar transistor 24 connected across the DC terminals of the rectifier bridge 22. It will be understood that this rectifier bridge/transistor combination is one of many ways to implement such a bidirectional AC electronic switch for synchronous switching in an AC circuit. The emitter of a further transistor 26 is connected to the base of transistor 24, transistor 26 serving the purpose of amplifying the signal produced by a control unit 18'. The control unit 18' contains an appropriate signal generator 19' which generally corresponds to signal generator 19 of FIG. 1 and provides the drive pulses for transistor 26. A resistor 28 connected in the collector circuit of transistor 26 serves to limit the collector current to that required to provide appropriate switching of transistor 26 and thereby hold the transistor switch 24 in the "on" state thereof. It will be evident that depending upon the output level of the signal generator 19' and/or the gain of the transistor switch 24, both transistor 26 and resistor 28 could conceivably be eliminated. Alternatively, the collector of transistor 26 could be connected to the collector of transistor 24 (i.e., so as to provide a Darlington connection) and resistor 28 eliminated. It is noted that suitable DC supply voltages are provided by a DC power source 40, derived from the AC power source 10'. The power consumed in actuation of the control unit 18' is the control power and by design should approach zero.

The switch drive signal produced by control unit 18' is generated in some fixed relationship to the zero crossover of the alternating voltage source carrier wave. The drive signal terminates at some point in time determined by a controlled variable, i.e., by virtue of the action of an appropriate signal generator 19' in responding to either closed or open loop control. For example, where the inductive load is a lamp load, the output of a light sensor, indicated in dashed lines at 30 and used in sensing the illumination output of the lamp load, can be fed back to the signal generator to control the output signal generated thereby. A suitable control signal generator is disclosed in my concurrently filed, copending application Ser. No. 571,829, entitled Control Signal Generator for AC Power Control, the disclosure of which is hereby incorporated by reference.

Figure 6:
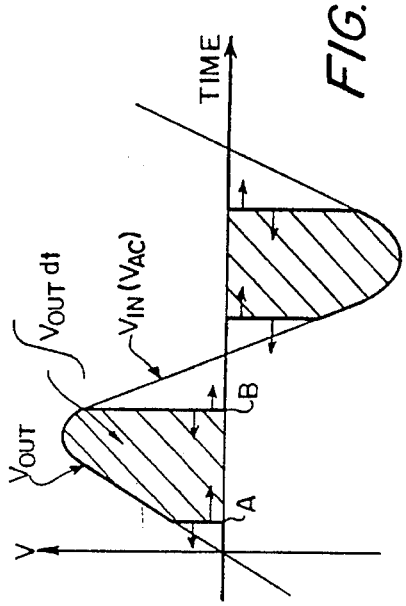
FIG. 6 is a waveform diagram illustrating a typical pulse duration modulated waveform associated with the circuit of FIG. 5.

As discussed above, in accordance with an important aspect of the invention, a circuit is provided which senses the natural zero of the transient response state of a transient suppressing clamping capacitor (20 or 20'), shunting the synchronous switch 16' (or 24 and 22), i.e., senses the condition $V_{SW}=0$. In the embodiment of FIG. 5, the circuit is constituted by a transistor 32 the collector-emitter circuit of which is connected between the base of transistor 26 and "signal common" line or bus and a pair of resistors 34 and 36 which are connected to the plus terminal of full wave bridge 22 and the base of transistor 32, and to the base of transistor 32 and the signal common line or bus. This circuit controls the time of turn-off of transistor 32 such that when the capacitor voltage $V_{SW}$ approaches zero, transistor 32 turns "off" and transistor 26 and transistor switch 24 turn "on". Resistors 34 and 36 sense the voltage on the synchronous switch 16, and capacitor 20', as this voltage appears, in its rectified form, at the plus terminal of full wave rectifying bridge 22. If any significant voltage is present on the synchronous switch 16, transistor 32 is turned "on", and thus acts as a current sink or path for the output from the signal generator 19' to signal common. Under these conditions, the output from signal generator 19' is inhibited from turning on transistor 26 and from turning on synchronous switch 16'. When the voltage on synchronous switch 16' declines to a level approaching zero, transistor 32 is turned off and hence, the remaining portion of the output pulse from signal generator 18' turns on transistor 26 which turns on transistor switch 24. It is noted that this half cycle to half cycle variable turn-on, turn-off operation causes the occurrence of the trailing edge of the output pulse from signal generator 19', i.e., the time that the pulse is terminated, to be readjusted to give the desired volt-second area of $V_{out}$, which is the controlled quantity of a PDM system in either closed or open loop operation. This is illustrated in FIG. 6, wherein the natural zero of the voltage on switch 16' ($V_{SW}$), which is sensed and adjusted as required each half cycle, and which constitutes the time $t_1$ in the output pulse ($V_{out}$), is indicated at A and the point in time, i.e., the time $t_2$, at which the output pulse is terminated, is indicated at B. The time at which point B occurs is adjusted relative to the natural zero point A so as to provide the desired-second area ($\int V_{out}dt$) per half cycle, which, as stated, is the controlled quantity in a PDM system.

It will be understood from the foregoing that whenever the synchronous switch 16', and thus capacitor 20', has a significant voltage across the plus-minus terminals thereof, transistor switch 24 is inhibited from turning on by virtue of the operation of the synchronous switch voltage sensing circuit. It will also be appreciated that an operational amplifier and/or other circuitry could be used to replace transistor 32 as part of the synchronous switch voltage sensing circuit. For example, such an operational amplifier could be implemented with the signal generator output as one input and the sensed capacitor (rectified) voltage at the positive terminal of bridge 22 as the other input, with the output of the operational amplifier being used to drive transistor 26 and thus transistor 24. This approach, and that illustrated in FIG. 5 and discussed above, only represent two of many circuits that would be used in sensing the state of the synchronous switch 16' to inhibit turn on of the switch until $V_{SW}=0$.

Furthermore, it will be understood from the foregoing that the disclosed method of control (i.e., switch closed when $V_{SW}=0$ and the trailing edge adjustment of ($V_{out}$) used to meet the requirements of the controlled quantity (volt-second area) of a PDM system, solves the problem of opening a current carrying inductive load circuit and the problem of closing a synchronous switch in circuit relationship with a shunt capacitor. In addition, the system power factor is generally improved by leading VARS being added as active power is reduced.

Although the invention has been described relative to exemplary embodiments thereof, it will be understood by those skilled in the art that variations and modifications can be effected in these exemplary embodiments without departing from the scope and spirit of the invention.

I claim:

1. In a system for controlling AC power supplied from an AC source to an inductive load of the type comprising a switch connected between the AC source and the inductive load, control means for controlling switching of said switch in timed relation to the AC source carrier wave so as to control the power supplied to said inductive load, and a capacitor connected in shunt across the switch, said control means controlling the operation of said switch such that the switch is closed near the beginning of each half wave of the AC source carrier wave and such that the switch is opened at a subsequent, variable time during each half wave, said system further comprising sensing means for sensing the voltage on said switch during each half wave and for inhibiting closing of said switch by said control means during the half wave until the voltage on said switch is substantially zero.

2. In a system for controlling AC power as claimed in claim 1 wherein said switch comprises an electronic switch.

3. In a system for controlling AC power as claimed in claim 2 wherein said electronic switch comprises a transistor the collector-emitter circuit of which is connected between a first pair of terminals of a full wave bridge circuit and the base circuit of which is connected to said control means, said capacitor being connected across the other pair of terminals of said bridge circuit.

4. In a system for controlling AC power as claimed in claim 3 wherein said voltage sensing means comprises means for sensing the voltage at one of the terminals of the bridge circuit.

5. In a system for controlling AC power as claimed in claim 4 wherein said bridge terminal voltage sensing means comprises a further transistor the base circuit of which is connected to said bridge terminal and the collector-emitter circuit of which is connected in the base circuit of the first mentioned transistor in shunt with the connection between the base circuit of said first mentioned transistor and said control means so that switching of said further transistor controls transmission of the output signal from the control means to the base circuit of the first mentioned transistor.

6. In a system for controlling AC power as claimed in claim 5 wherein the base of said further transistor is connected to a positive terminal of said bridge through a first resistor and a further resistor is connected between the base circuit of the further transistor and a common supply line to which the emitter electrodes of said transistors are connected.

7. In a system for controlling AC power as claimed in claim 6 wherein the energy from AC source is combined with the stored energy in the system when the switch is opened so as to produce a voltage in excess of the AC source voltage which causes the current flow to reverse and supplies leading volt-amperes reactive back to the AC source.

8. A driver for applying power to an electrical load device from a voltage supply comprising:

first electronic switching means adapted for connection to the load device that is capable of assuming a first state in which energizing voltage of a level that is sufficient to operate the load can be applied to the load by the voltage supply and a second state in which said energizing voltage cannot be applied to the load;

second electronic switching means operatively associated with said first electronic switching means for effecting the transition of said first electronic switching means between said first and second states thereof; said second electronic switching means being selectively switchable between a first state in which said second electronic switching means causes said first electronic switching means to assume its said first state, and a second state in which said second electronic switching means causes said first electronic switching means to assume its said second state; said second electronic switching means defining an input adapted to receive control signals, receipt by said second electronic switching means at said input of a control signal of a predetermined nature when said second electronic switching means is in its said first state causing said second electronic switching means to leave its said first state to assume its said second state; said second electronic switching means being automatically returned from said second state to said first state when the difference in electric potential between the supply and the load is less than a predetermined threshold.

9. The driver recited by claim 8 wherein said voltage supply is an AC voltage supply.

10. The driver recited by claim 9 wherein said predetermined threshold is substantially zero.

11. The driver recited by claim 8 wherein the electrical load device is an inductive load which generates a back EMF when supplied AC voltage is applied and subsequently removed from the load.

12. The driver recited by claim 8 wherein the AC voltage supply includes a full wave bridge rectifier adapted for connection the electrical load device and a capacitor adapted for series connection with the electrical load device and the AC voltage supply, and wherein the electrical load device presents an inductive load to said full wave bridge rectifier and said capacitor is responsive to reduce the voltage surge caused by the back EMF generated by said inductive load when supplied AC voltage is removed therefrom.

13. In a system for controlling power supplied from an AC source to an inductive load, wherein at least one switch controls current flow to the inductive load, and capacitance is connected in the system with the at least one switch and the inductive load, the improvement comprising control means for inhibiting closing of said at least one switch to enable current flow to the inductive load, until the voltage on said switch approaches substantially zero volts so that the amount of stored energy that said switch must dissipate upon closing of said switch is minimized.

14. A system as claimed in claim 1 wherein said load comprises at least one gas discharge lamp.

15. In a system for controlling power supplied from an AC source to a lamp load including a ballasting device and a control circuit, wherein said control circuit comprises at least one switch, having an input and an output, for controlling current flow to the lamp load, and said control circuit includes capacitance so that the control circuit stores energy, the improvement comprising control means for inhibiting closing of said at least one switch to enable current flow to the lamp load, until the voltage across the input and output of said switch approaches substantially zero volts so that the amount of energy stored, in the control circuit that said switch must dissipate upon closing of said switch is minimized.

* * * * *